Oct. 11, 1960 G. H. FRITZINGER 2,955,896

INDEX MARKING MEANS FOR SHEET RECORD MACHINES

Filed Dec. 27, 1957

INVENTOR.

George H. Fritzinger

United States Patent Office
2,955,896
Patented Oct. 11, 1960

2,955,896

INDEX MARKING MEANS FOR SHEET RECORD MACHINES

George H. Fritzinger, West Orange, N.J., assignor to McGraw-Edison Company, Elgin, Ill., a corporation of Delaware Filed Dec. 27, 1957, Ser. No. 705,668

10 Claims. (Cl. 346—103)

This invention relates to sheet record machines employed for dictation recording and reproducing purposes, and more particularly it relates to a simple and inexpensive index marking means for such machines.

The invention is intended particularly for dictating machines using a flexible magnetic sheet record medium provided with a coat of finely divided iron oxide or other magnetizable material, but no unnecessary limitation to sheet record machines of the magnetic type is intended.

It is a common practice to provide dictating machines with an index marking means by which the user can make registrations or marks at points corresponding to the positioning of the recording head on the record, such marks being for the benefit of the transcriber to denote where "lengths" of separate items of recordation, "corrections" or other indications are made. These marks have been generally made on an index slip separate from the record itself, but this is particularly unsatisfactory in connection with sheet records because of the difficulty of keeping each index slip attached to the respective sheet record during the handling of the records as between the user and the transcriber. The prior proposals for indexing directly on the sheet record, while largely overcoming the above objections, have suffered from complexity of apparatus in making the marks in spatial relation to the recording head on the record, and in the means required for converting the marks into a form usable to the transcriber.

An object of the present invention is to provide a new method of and apparatus for making indexing marks on or in connection with the sheet record of a dictating machine, which overcomes largely the objections in the previous indexing methods.

In carrying out my invention I provide a marking strip underneath a portion of the mounted sheet record which is responsive to pressure or impingement of a tool or stylus against the outer side of the record to provide visible marks which can be read easily by the transcriber. This marking strip may be one which will develop marks on itself responsive to pressure or a mechanical blow against the record and which can be erased therefrom after the marks have served their useful purpose. Preferably, however, I employ a color transfer strip having a pressure sensitive adhesive backing enabling it to be readily applied and removed for replacement by another as needed. Such transfer strip, which may be in the form of that known as carbon paper used in making duplicate copies in typing, transfers color marks to an underlying surface wherever it is pressed or impinged upon. The underlying surface may be that of the record support but is preferably the adjacent surface of an overlapped portion of the sheet record. For example, such overlapped portion may be provided with a durable surface which may itself be also replaceable, or it may be a frosted or etched surface of a plastic backing film of the sheet record, but in either case it is a surface of a character which will readily receive a carbon mark and from which such marks can be repeatedly erased.

It is therefore a further object of my invention to provide for an indexing on the back side or on an unrecorded overlapped front side of a sheet record medium with marks produced by pressure or a blow of a mechanical tool and which can be repeatedly erased or otherwise expunged.

Another object is to provide the sheet record with a marking strip on an unrecordable surface thereof which is removably adhesively engaged with the sheet record so that it can be readily replaced by a new marking strip when needed.

Another object is to provide the sheet record with such length that its trailing portion overlaps its leading portion and to apply to the backside of the trailing portion a carbon paper which will make marks on the front side of the overlapped leading portion at points where the overlapping portion of the record is pressed or struck by a mechanical tool or stylus.

Another object is to provide a simple and inexpensive marking mechanism which when set for operation is timed with the rotation of the record support to engage the record portion bearing the marking strip as such portion is moved past the marking tool.

Another object is to provide an interlock between a manual setting means for the marking mechanism and the record support and/or record ejecting means to prevent ejection of a record until a record has been advanced sufficiently following operation of the setting means to cause an indexing mark to be made.

A further object is to provide the marking means with such interlock as will restore the manual setting means to unoperated position responsive to operation of the marking tool.

These and other objects and features of my invention will be apparent from the following description and the appended claims.

In describing my invention, reference is had to the accompanying drawings, of which:

Figures 1, 2, 3:
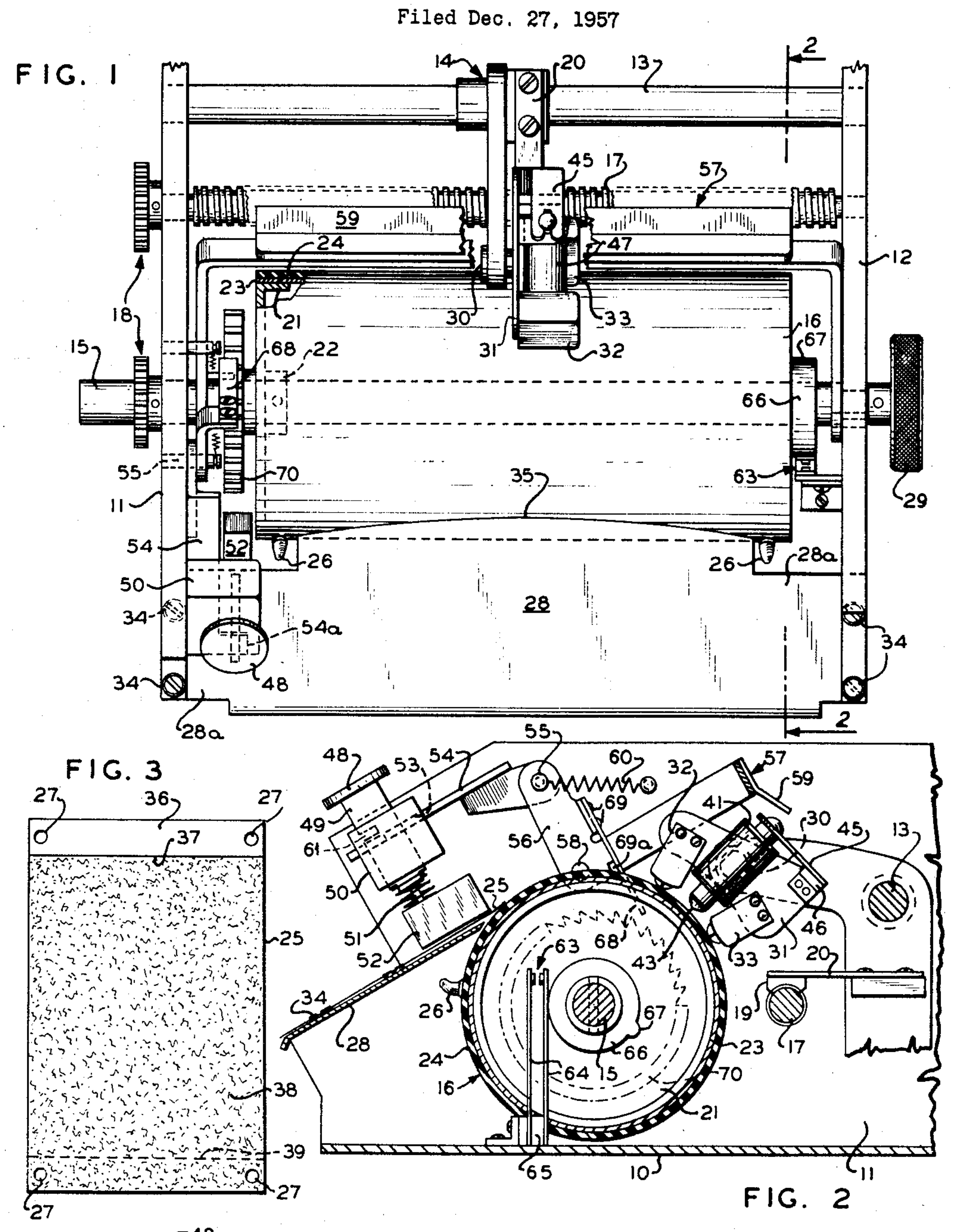
Figure 1 is a top plan view of a sheet record dictating machine incorporating my invention.
Figure 2 is a fractional right-hand view, with parts in section substantially on the line 2—2 of Figure 1.
Figure 3 is a plan view to reduced scale of a sheet record adapted for index marking in accordance with the present invention.

The sheet record machine shown in the accompanying drawings may have a base plate 10 provided with two parallel upright standards 11 and 12 at the sides. These standards support a cross-rod 13 on which a carriage 14 is slideably mounted, and provide bearings for a shaft 15 which carries a rotatable record support in the shape, for example, of a drum 16. Also the side standards provide bearings for a feed screw 17 for driving the carriage. The feed screw is in constant engagement with the shaft 15 provided by means by a gear train fractionally indicated at 18. The carriage has a feed nut 19 mounted resiliently thereon by a cantilever spring 20, which engages the feed screw to propel the carriage slowly along the drum as the drum is rotated.

The drum may comprise flanged discs 21 at its ends having hubs 22 pinned to the shaft 15, and has a tubular member 23 embracing the flanged discs and secured thereto as by welding. Covering the tube 23 is a sleeve 24 of resilient material such as rubber to provide a yieldable backing for a sheet record 25 when mounted thereon.

The leading edge of the sheet record is attached releasably to the drum for drive of the sheet record in wrap-around relation thereto with preferably a small overlap. A preferred attaching means comprises two radial hooks 26 axially in line along the drum and positioned respectively near the opposite ends thereof. The sheet record has holes 27 (Figure 3) in the leading corner portions thereof for engaging the hooks. To mount a sheet record on the drum it is necessary to place it in a loading position. This is done by presenting the sheet into the machine across a loading and stripping plate 28 tangential to the drum, until the leading edge of the sheet record overlies the drum and the holes 27 are centered substantially with respect to the radius lines of the drum at right angles to the sheet. Thereupon, the drum is advanced, as by a knob 29 on the shaft 15 to cause the hooks to engage the holes 27 and thereupon propel the sheet record around the drum, it being understood that as the drum is so advanced while the sheet record is in loading position the hooks will first deflect upwardly the leading side portions of the record and then enter the holes by the downward deflection of the sheet record caused by its weight and resilient tendency to resist upward deflection.

Pivoted at 30 to the carriage 14 is a rocker beam 31 carrying an erase head 32 at one end and a record-reproduce head 33 at the other. The two heads contact the sheet record in a plane at right angles to the shaft 15 so as to ride in the same track on the record. In response to their weight and/or any torsional biasing of the carriage 14, if desired, the heads engage the sheet record with sufficient pressure to have firm contact therewith. As the drum is advanced and the carriage is progressively moved by the feed screw 17, the heads scan a helical track on the sheet record which, when the sheet record is removed and laid out flat, appears as a series of parallel lines.

As shown in Figures 1 and 2, the loading plate 28 has side wings 28*a* which overlie inclined edges on the side standards 11 and 12 and are secured thereto by screws 34. The stripping edge 35 of the loading plate is preferably concave so as to facilitate its engagement with the underside of the trailing portion of the record when the drum is reversed. In order to confine the sheet record in close proximity to the drum during such reverse rotation, a cylindrical guide wall is provided around the drum in spaced relation thereto, except for openings at the loading station and at the erase and record-reproduce heads, but such guide wall need not be herein shown for purposes of the present invention.

The above described sheet record machine is only an illustrative one to which my novel indexing arrangement has been applied. For purposes of this indexing means, the sheet record 25 is preferably made longer than the periphery of the drum 15 so that its trailing portion will overlap a leading portion 36 to a line 37 on the record. The record may comprise a backing film such as of Mylar or it may be a suitably strong paper. The portion of the outer side of the mounted record running from the line 37 to the trailing edge thereof is provided with a thin coat of a magnetizable material such as of finely divided iron oxide indicated by the random marks 38. The underside of the trailing overlapping portion of the record is provided with a marking strip 39 of a color-transfer material such as ordinary carbon paper used for making duplicate copies in typing. The carbon strip is provided preferably with a pressure-sensitive adhesive side to enable it to be held releasably to the sheet record so that it can be easily removed and replaced by another as needed. The uncoated outer side of the leading portion 36 of the sheet record is adapted to receive the carbon or other color marks from the marking strip 38 as the overlapping portion of the record is engaged with pressure by a marking tool. For example, the leading portion 36 may be covered with a strong paper from which the marks can be repeatedly erased as with a rubber eraser.

Such strong paper covering may itself be provided with a pressure-sensitive adhesive backing to enable it also to be stripped off and replaced by another as needed. Alternatively, the leading portion 36 may comprise the backing film of the record itself and such exposed backing film may have a frosted, etched or painted surface to enable it to receive readily the marks from the overlying carbon strip 39.

The marking means is in the form, for example, of a solenoid 40 having a U frame 41 as of soft iron mounted on the rocker 31 between the erase and record-reproduce heads 32 and 33. This solenoid has a plunger or armature 42 at about right angles to the drum provided with a pointed end to form a marking stylus 43. The armature is made of magnetic material such as of soft iron running from the marking end to an intermediate line 44 short of the upper end of the U frame by the distance of the stroke of the armature, and has its remaining length of non-magnetic material such as of brass. The armature is held yieldably in an intermediate position by a cantilever spring 45 which has a forked end engaging a grooved outer end portion of the armature and a base end mounted on a bracket 46 secured to the rocker plate 31. Surrounding the armature is a coil 47 which when energized propels the armature 42 away from the drum against the force of the spring 45. However, when the circuit of the coil is broken the armature is returned by the spring 45, and by inertia overthrow its stylus end 43 is caused to strike a blow against the record on the drum. Such a blow against the trailing overlapping portion of a mounted sheet record causes a dot to be made on the leading surface 36 of the record.

The control means for the marking solenoid 40 comprises a push key 48 having a shank 49 mounted slideably in a block 50 on the left standard 11. This key is depressable against a push button 51 of a small switch 52 to close this switch. Passing through a cross-cut 53 in the left side of the block 50 and extending side wise through the front portion thereof ahead of the slot receiving the shank 49, is a latch side 54 having a side lug or hook 54*a* at its front end ahead of the shank of the key 48. This slide has a turned over lug at its back end pivoted at 55 to an upstanding arm 56 of a horizontal bail 57. This bail spans the distance between the two side standards 11 and 12, and is pivoted at each end, as at 58 at its left end, to the respective side standard. Secured to the bail is an angle iron 59 the lower half portion of which depends below the bail and overlies the marking solenoid throughout its length of travel along the drum.

Figure 4:
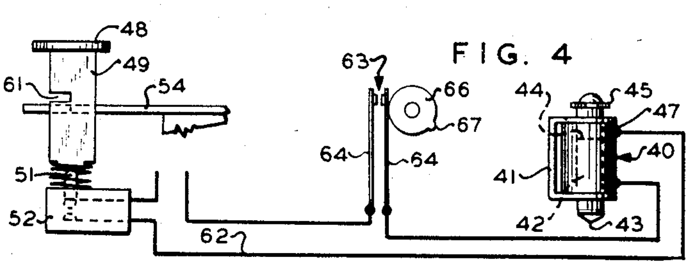
Figure 4 is a circuit diagram of the control means for the present index marking mechanism.

The latch slide 54 is urged rearwardly by a tension spring 60 into its position defined by abutment of the hook 54*a* against the shank of the key 48. When the key is depressed to close the switch 52 a notch 61 in the shank thereof comes into registration with the latch hook 54*a* and is engaged thereby under influence of the spring 58 to latch the switch closed. As the switch is so latched the bail 57 is shifted downwardly to place the angle iron 59 directly over the armature of the marking solenoid. The switch 52 is connected in an energizing circuit 62 of the marking solenoid as shown in Figure 4, but the initial closing of this switch by the key 48 does not cause the marking solenoid to be then operated because of a timing switch 63 also serially connected in the circuit 62. This timing switch comprises two spring contact arms 64 mounted in cantilever fashion in an insulating block 65 bracketed to the base 10 at the end of the drum 16. One of the contact springs rides against a collar 66 on the shaft 15. This collar has a single cam lobe 67 positioned to close the switch 63 as the overlapped portions of the sheet record pass the marking solenoid. As soon as the switch 63 is thus closed following a depressing of the marking control key 48, the solenoid is activated to withdraw its armature away from the drum but as this withdrawal occurs the upper end of the armature 42 strikes the angle iron 59 to cam the bail upwardly and release the latch from the key 48. The key is then snapped upwardly and the switch 52 is opened to break the circuit of the solenoid. As soon as this break occurs the armature 42 is returned downwardly by the spring 45 and by inertia overthrow its stylus end 43 strikes once against the overlapping portion of the sheet record to make a mark on the leading portion 36 at a position corresponding to the positioning of the heads along the drum.

It will be understood that one may depress the marking key 48 and then stop the machine before the overlapping portions of the record have passed the marking solenoid. In order to assure that the mark which was intended when the key 48 was depressed will be made before the sheet record is ejected from the machine, a means is provided to lock the drum against being reversely rotated after the key 48 is depressed until the solenoid 40 has been next activated. This means comprises simply a cantilever spring arm 68 secured at 69 to a lug turned over from the left end portion of the bail 57. The arm is biased against and is located by a stop lug 69a on the bail. Mounted on the shaft 15 at the left end of the drum is a ratchet wheel 70. As the bail is shifted clockwise responsive to a latching of the key 48 the spring arm 68 is moved into engagement with this ratchet wheel. This engagement does not interfere with the forward clockwise driving of the record supporting drum but it does latch the drum against reverse movement. Thus, if the machine is stopped after the key 48 is depresesd but before the marking solenoid is operated, the user will have to resume the forward drive of the drum or turn the drum forwardly by hand until the marking solenoid is operated before he can turn the drum in the reverse direction by the knob to unload the sheet record.

The present invention contemplates various alternatives to the above described form of sheet record. For example, the marking strip 39 may be of a so-called "magic slate" material comprising a base lamination having a waxy coloring surface and an overlying lamination of a transparent film-like material which when pressed against the base material will make a mark and which when released therefrom causes the mark to disappear. In this event, overlap of the trailing portion of the sheet record by the leading portion thereof is no longer necessary. As another alternative for a sheet record mounted without overlap, a carbon type marking strip 39 may be mounted on the drum and the back side of the sheet record, preferably of a trailing portion thereof, is conditioned to receive marks from the carbon strip when struck by a marking tool as hereinbefore described. Still further, it will be understood that a plurality of marking solenoids controlled by respective keys may be employed to make distinguishing marks for denoting respectively length and correction indications. Such and other changes and modifications may be made without departure from the scope of my invention, which I endeavor to express according to the following claims.

I claim:

1. In an index marking system for a sheet record machine; the combination of a revolvable record support; a sheet record mounted on said support in wrap-around relation thereto; a marking strip underneath a portion of said sheet record and extending throughout the width of the active surface of the record, said marking strip comprising means for producing a mark responsive to a pressure exerted against the outer side of the record portion overlying the marking strip; a marking stylus positioned adjacent to said support; means mounting said stylus for traveling movement along said record support in directions crosswise to the direction of record movement; means activatable to cause said marking stylus to engage a sheet record mounted on said support; and means controlled by said record support according to the rotational positioning thereof for limiting operation of said activatable means to that portion of each revolution of said support wherein said marking stylus is in registration with said portion of the mounted sheet record overlying said marking strip.

2. The index marking system set forth in claim 1 wherein said marking strip has a pressure-sensitive adhesive surface for releasably securing it to the sheet record.

3. The index marking system set forth in claim 1 wherein said sheet record has a greater length than the peripheral length of said support to cause the trailing portion to overlap a leading portion thereof when the record is wrapped around the support, and wherein the outer exposed surface of said sheet record has a coat of magnetizable material and the trailing overlapping portion is provided with a carbon paper on its under surface and wherein the overlapped leading portion of the record has an outer surface free of said magnetizable material and adapted to receive color marks from said carbon paper at points where pressure is exerted against the outer side of the overlapping portion of the record by said marking styles.

4. The index marking system set forth in claim 1 including a motor means for driving said support in an advancing direction and manual means for revolving said support selectively in either advance or reverse directions, wherein said marking means include an activatable solenoid and a manually settable control means timed with said support to activate said solenoid as the portion of the record carrying said marking strip is moved past the solenoid; and means rendered operative upon actuation of said manual setting means for limiting movement of said support to its advance direction until said marking solenoid is next operated.

5. In a sheet record machine: the combination of a revolvable record support provided with a peripheral surface for carrying a flexible sheet record thereon; fastening means on the record support for engaging a leading portion of the sheet record to provide for drive of the sheet record with the support as the support is revolved in an advancing direction; sheet record marking means; and operating means for said marking means including a manual on-off marking control and timing means controlled by the revolving movement of said support and effective when said manual control is in "on" position for withholding operation of the marking means until the support is in a pre-determined position of its revolving movement.

6. In a sheet record machine: the combination of a revolvable record support having a peripheral surface for carrying a flexible sheet record thereon fastening means on said support for engaging a leading portion of the record to provide for drive of the record with the support as the support is advanced; electrically energizable record marking means mounted adjacent to said record support for movement along said support and normally disengaged therefrom; and an energizing circuit for said marking means serially including a manually settable control switch and a timing switch controlled in accordance with the advance movement of said support to cause the marking means following a manual setting of said control switch to engage momentarily the sheet record while the record support is in a predetermined position of its revolving movement.

7. In a sheet record machine: the combination of a revolvable record support having a peripheral surface for carrying a flexible sheet record thereon; a sheet record attached at its leading edge to said support and having a length greater than the peripheral length of said support to cause the record to be wrapped around said support and to overlap a leading portion of the record as the support is advanced; a marking material on an undersurface of the sheet record at the place of the overlapping thereof responsive to a mechanical blow struck against the outer side of the trailing overlapping portion of the record for producing a mark on the record; means for striking a blow against the record; means mounting said striking means for movement axially along the support; and means controlled by said support according to the rotational positioning thereof for limiting operation of said striking means on the overlapping portion of the sheet record during the advance movement of said support.

8. In a sheet record machine: the combination of a revolvable record support having a peripheral surface for carrying a flexible sheet record thereon; a sheet record attached at its leading edge to said support and having a length greater than the peripheral length of said support to cause the record to be wrapped around said support with an overlap, the underside of the trailing overlapping portion of the record having a surface coating responsive to a blow struck against the outer side of the overlapping portion of the record to transfer a mark to the outer side of the underlying overlapped portion of the record; a marking stylus mounted adjacent to the peripheral surface of said record support for movement into and out of engagement therewith; spring means for holding said stylus in a normal position at a clearance spacing from said support; activatable means for withdrawing said stylus from the record support against the resisting force of said spring means whereby upon release of said activatable means from an operated position said stylus is propelled by said spring means towards the record support and moved past said normal position to strike a record on said support by inertia overthrow; manually operable control means; and timing means rendered operative by said control means and controlled by the revolving movement of said support for momentarily activating said withdrawing means to cause said marking stylus to strike said overlapping portion of the record with pressure as the overlapping portion is moved past the marking stylus.

9. A sheet record for a dictating machine adapted to be supported and rotated while in the form of a closed loop with overlap of its leading portion by a trailing portion thereof; a coat of magnetizable material on the outer exposed surface of the sheet record running only from substantially the cross line on the record where said overlap ends to the trailing end of the record; and a marking strip on one of the confronting inside surfaces of the overlapped portion of the sheet record responsive to a pressure exerted against the outer side of the overlapping portion of the record for impressing a mark on the other of said confronting surfaces.

10. The sheet record set forth in claim 9 wherein said marking strip is applied to the underside of the overlapping portion of the sheet record and is of a color transfer type, and wherein the outer side of the overlapped portion of the record is free of magnetizable material and adapted for receiving color marks from said marking strip and from which the marks can be erased for repeated use of the record.

References Cited in the file of this patent

UNITED STATES PATENTS

| | | |
|---|---|---|
| 1,397,444 | Mohr | Nov. 15, 1921 |
| 1,699,847 | Kuhlman | Jan. 22, 1929 |
| 2,396,833 | Humy | Mar. 19, 1946 |
| 2,718,548 | Jelinek | Sept. 20, 1955 |
| 2,729,453 | Camras | Jan. 3, 1956 |
| 2,847,223 | Taylor et al. | Aug. 12, 1958 |